United States Patent
Keskitalo et al.

(10) Patent No.: US 10,187,860 B2
(45) Date of Patent: Jan. 22, 2019

(54) USER EQUIPMENT CONTEXT HANDLING WITH USER EQUIPMENT AUTONOMOUS MOBILITY

(71) Applicant: NOKIA CORPORATION, Espoo (FI)

(72) Inventors: Ilkka Keskitalo, Oulu (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 411 days.

(21) Appl. No.: 14/531,357

(22) Filed: Nov. 3, 2014

(65) Prior Publication Data

US 2016/0128007 A1 May 5, 2016

(51) Int. Cl.
*H04W 56/00* (2009.01)
*H04W 68/02* (2009.01)
*H04W 76/19* (2018.01)

(52) U.S. Cl.
CPC ......... *H04W 56/001* (2013.01); *H04W 68/02* (2013.01); *H04W 76/19* (2018.02)

(58) Field of Classification Search
CPC .................................................. H04W 56/001
See application file for complete search history.

(56) References Cited

U.S. PATENT DOCUMENTS

| 2013/0208699 A1* | 8/2013 | Hakkinen | H04W 76/38 370/331 |
| 2013/0260810 A1* | 10/2013 | Rayavarapu | H04W 76/19 455/509 |
| 2014/0146759 A1* | 5/2014 | Cho | H04W 76/028 370/329 |
| 2016/0007292 A1* | 1/2016 | Weng | H04W 52/0235 370/311 |

(Continued)

FOREIGN PATENT DOCUMENTS

EP    2 613 586 A1    7/2013

OTHER PUBLICATIONS

3GPP TR 37.869 V12.0.0 (Sep. 2013), "3rd Generation Partnership Project; Technical Specification Group Radio Access Network; Study on Enhancements to Machine-Type Communications (MTC) and other Mobile Data Applications; Radio Access Network (RAN) aspects (Release 12)".

(Continued)

*Primary Examiner* — Sulaiman Nooristany
(74) *Attorney, Agent, or Firm* — Squire Patton Boggs (US) LLP

(57) ABSTRACT

Systems, methods, apparatuses, and computer program products for UE context handling with UE autonomous mobility are provided. One method includes transitioning, by a user equipment associated with a network, into a user equipment controlled mobility mode based on a predefined trigger. The method may further include synchronizing with (Continued)

at least one network node serving the user equipment so that the at least one network node is informed of the transitioning of the user equipment into the user equipment controlled mobility mode. The evolved node B (eNB) may inform a core network node about the user equipment operational mode, and the core network node takes into account the user equipment operational mode during a following transaction with the user equipment.

13 Claims, 4 Drawing Sheets

(56) References Cited

U.S. PATENT DOCUMENTS

2016/0302153 A1* 10/2016 Martin ............... H04W 52/0212

OTHER PUBLICATIONS

3GPP TS 36.401 V12.0.0 (Sep. 2014), "3rd Generation Partnership Project; Technical Specification Group Radio Access Network; Evolved Universal Terrestrial Radio Access Network (E-UTRAN); Architecture description (Release 12)".

3GPP TSG-RAN-WG2 Meeting #83 (Aug. 19-23, 2013), Barcelona, Spain. R2-132687 "Mobility aspects of small data transmission" BlackBerry UK Ltd.

"LTE and the Evolution to 4G Wireless—Design and Measurement Challenges: Bonus Material: Security in the LTE-SAE Network." (Jul. 23, 2009); www.agilent.com/find/lte.

3GPP TR 23.887 V12.0.0 (Dec. 2013), "3rd Generation Partnership Project; Technical Specification Group Services and System Aspects; Study on Machine-Type Communications (MTC) and other mobile data applications communications enhancements (Release 12)".

3GPP TSG-RAN WG2 Meeting #83 (Aug. 19-23, 2013), Barcelona, Spain. R2-132838 "Summary of email discussion [82#12][Joint/MTCe] Signalling gain evaluation for SDDTE" ZTE Corporation.

3GPP TSG-RAN WG2 Meeting #83 (Aug. 19-23, 2013), Barcelona, Spain. R2-132401 "Small Packet Transmissions in Semi-Idle State" Renesas Mobile Europe Ltd.

3GPP TSG RAN Meeting #66 (Jun. 10-13, 2014) Sophia Antipolis, France. RP-140702 "Mobility Enhancements" Mediatek Inc.

* cited by examiner

USER EQUIPMENT CONTEXT HANDLING WITH USER EQUIPMENT AUTONOMOUS MOBILITY

FIELD

Embodiments of the invention may generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology.

BACKGROUND

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A is carrier aggregation, which allows for increasing the data rates through aggregation of two or more LTE carriers.

SUMMARY

One embodiment is directed to a method that may include transitioning, by a user equipment associated with a network, into a user equipment operational mode based on a predefined trigger. The method may also include synchronizing with an evolved node B (eNB) serving the user equipment so that the eNB is informed when the user equipment transitions into the user equipment operational mode. The evolved node B (eNB) may inform a core network node about the user equipment operational mode, and the core network node may take into account the user equipment operational mode during a following transaction with the user equipment.

In an embodiment, the method may further include listening for paging from the network, and responding to the paging with a connection re-establishment request. In one embodiment, the user equipment operational mode may be a user equipment controlled mobility mode.

According to one embodiment, the method may also include maintaining, by the user equipment, information needed for a radio resource control connection.

In certain embodiments, the predefined trigger may comprise a timer and/or explicit signaling with the network. For example, in some embodiments, the transitioning may be based on the expiry of a timer in the user equipment and in the eNB.

Another embodiment is directed to an apparatus that includes at least one processor and at least one memory including computer program code. The at least one memory and computer program code may be configured, with the at least one processor, to cause the apparatus at least to transition into a user equipment operational mode based on a predefined trigger, and to synchronize with an evolved node B (eNB) serving the apparatus so that the eNB is informed when the apparatus transitions into the user equipment operational mode. The evolved node B (eNB) may inform a core network node about the user equipment operational mode, and the core network node may take into account the user equipment operational mode during a following transaction with the user equipment.

In an embodiment, the apparatus may comprise a user equipment associated with a network, and the at least one memory and the computer program code may be configured, with the at least one processor, to cause the apparatus at least to listen for paging from the network, and to respond to the paging with a connection re-establishment request. In one embodiment, the user equipment operational mode may be a user equipment controlled mobility mode.

According to one embodiment, the at least one memory and the computer program code may be configured, with the at least one processor, to cause the apparatus at least to maintain information needed for a radio resource control connection. In one embodiment, the predefined trigger may comprise a timer and/or explicit signaling with the network. For example, in some embodiments, the transitioning may be based on the expiry of a timer in the apparatus and in the eNB.

Another embodiment is directed to a computer program, embodied on a non-transitory computer readable medium. The computer program may be configured to control a processor to perform a process that includes transitioning, by a user equipment associated with a network, into a user equipment operational mode based on a predefined trigger. The process may also include synchronizing with an evolved node B (eNB) serving the user equipment so that the eNB is informed when the user equipment transitions into the user equipment operational mode. The evolved node B (eNB) may inform a core network node about the user equipment operational mode, and the core network node may take into account the user equipment operational mode during a following transaction with the user equipment.

Another embodiment is directed to a method that may include synchronizing, by a network entity, with a user equipment such that the network entity is informed of a transitioning of the user equipment into a user equipment operational mode. The method may also include providing an indication to a core network node about the transitioning of the user equipment into the user equipment operational mode, and uploading user equipment context to the core network node.

In an embodiment, the user equipment context is sent from the network entity to the core network node along with the information about the UE controlled mobility mode. According to one embodiment, the indication is sent with signaling messages related to user equipment context handling or mobility handling. The signaling messages related to user equipment context handling may be a UE CONTEXT MODIFICATION RESPONSE. In certain embodiments, the network entity comprises an evolved node B, and the core network node comprises a mobility management entity. In one embodiment, the user equipment operational mode may be a user equipment controlled mobility mode.

Another embodiment is directed to an apparatus that includes at least one processor and at least one memory including computer program code. The at least one memory and computer program code may be configured, with the at least one processor, to cause the apparatus at least to synchronize with a user equipment such that the apparatus becomes aware of a transitioning of the user equipment into a user equipment operational mode, to provide an indication to a core network node about the transitioning of the user equipment into the user equipment operational mode, and to upload user equipment context to the core network node. The indication could be also related to the traffic characteristics or the user equipment type.

In an embodiment, the at least one memory and the computer program code may be configured, with the at least one processor, to cause the apparatus at least to maintain information needed for a radio resource control connection. According to certain embodiments, the apparatus may comprise an evolved node B (eNB), and the core network node may comprise a mobility management entity. In one embodiment, the user equipment operational mode may be a user equipment controlled mobility mode.

Another embodiment is directed to a computer program, embodied on a non-transitory computer readable medium. The computer program may be configured to control a processor to perform a process that includes synchronizing, by a network entity, with a user equipment such that the network entity is informed of a transitioning of the user equipment into a user equipment operational mode. The method may also include providing an indication to a core network node about the transitioning of the user equipment into the user equipment operational mode, and uploading user equipment context to the core network node.

Another embodiment is directed to a method that includes receiving, by a core network node, an indication of a transitioning of a user equipment into a user equipment operational mode, where the indication is received from at least one network entity serving the user equipment. The method may also include utilizing the user equipment operational mode during a following transaction with the user equipment.

In certain embodiments, the method may also include initiating a paging request that is optimized for the user equipment operational mode, and relaying user equipment context back to the at least one network node. In one embodiment, the user equipment operational mode may be a user equipment controlled mobility mode.

In an embodiment, the method may also include informing, by the core network node, one or more evolved node Bs (eNBs), to which the paging request is sent, about the user equipment controlled mobility mode. According to one embodiment, the core network node sends the user equipment context to the eNB(s) when indicating about the UE controlled mobility mode in the paging message.

In certain embodiments, the method may also include sending a paging message comprising an indication to the user equipment that the at least one network entity has the user equipment context available to resume an existing radio resource control connection. In addition, in one embodiment, the method may further include optimizing paging coverage for the user equipment controlled mobility mode to reduce the number of cells where the paging is sent. In one embodiment, the at least one network entity may comprise an evolved node B (eNB).

Another embodiment is directed to an apparatus that includes at least one processor and at least one memory including computer program code. The at least one memory and computer program code may be configured, with the at least one processor, to cause the apparatus at least to receive an indication of a transitioning of a user equipment into a user equipment operational mode, where the indication is received from at least one network entity serving the user equipment, and to utilize the user equipment operational mode during a following transaction with the user equipment.

In an embodiment, the at least one memory and the computer program code may be configured, with the at least one processor, to cause the apparatus at least to initiate a paging request that is optimized for the user equipment operational mode, and to relay user equipment context back to the at least one network node. In one embodiment, the user equipment operational mode may be a user equipment controlled mobility mode.

In one embodiment, the at least one memory and the computer program code may be configured, with the at least one processor, to cause the apparatus at least to send a paging message comprising an indication to the user equipment that the at least one network entity has the user equipment context available to resume an existing radio resource control connection. According to certain embodiments, the apparatus may comprise a mobility management entity (MME), and the at least one network entity may comprise an evolved node B (eNB).

Another embodiment is directed to a computer program, embodied on a non-transitory computer readable medium. The computer program may be configured to control a processor to perform a process that includes receiving, by a core network node, an indication of a transitioning of a user equipment into a user equipment operational mode, where the indication is received from at least one network entity serving the user equipment. The process may also include utilizing the user equipment operational mode during a following transaction with the user equipment.

BRIEF DESCRIPTION OF THE DRAWINGS

For proper understanding of the invention, reference should be made to the accompanying drawings, wherein.

DETAILED DESCRIPTION

Figure 1A:
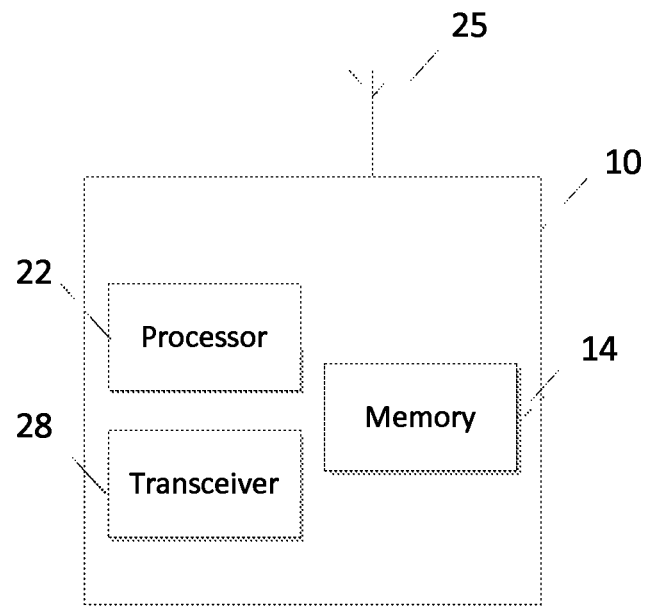
FIG. 1a illustrates a block diagram of an apparatus, according to one embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products for UE context handling with UE autonomous mobility, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The third generation partnership project (3GPP) is studying solutions that would minimize signaling overhead and UE power consumption with infrequent small data transfer. Such traffic is typical for Machine Type Communication (MTC) devices, but also for smart phones when they generate only background traffic (e.g., MTCe study item for Release 12). The inter-arrival of traffic bursts may vary greatly; for MTC devices it can be of some tens of seconds, minutes, days or even weeks, whereas with smart phones the interval is typically counted in seconds or tens of seconds. The data amount per burst may be small which may result in high signaling overhead compared to payload data.

With such traffic characteristics, one option to minimize signaling overhead is to release the connection soon after the data transfer. By this approach, the connected state mobility signaling can be reduced. However, this would be done at the cost of increased state transition signaling, i.e., connection release and setup signaling. In order to simultaneously reduce both mobility and state transition signaling, it has been proposed to allow UE controlled mobility a.k.a. autonomous mobility for the radio resource control (RRC) connected UE until new data transfer begins. Such an option is in included in the RAN2 TR 37.869 and in separate contributions, such as R2-132687, R2-132838. There is also a relation to proposal for semi-idle state where the new state is fairly close to the mode of the UE controlled mobility, as described in R2-132401. Further, a new Release 13 Work Item proposal, RP-140702, has been submitted aiming to specify connected mode mobility using cell re-selections instead of handovers.

Contributed results (e.g., R2-132838 & RP-140702) indicate that with the UE controlled mobility, there is the possibility to achieve minimized signaling overhead in wide range of traffic and mobility scenarios. This is based on the simulations/calculations mainly with mobile originated (MO) data. What may, however, require optimization and advanced features is the procedure to resume the data transmission (after being in UE controlled mobility mode) for mobile terminated (MT) data transfer.

Certain embodiments of the present invention provide new options optimizing the re-activation of mobile terminated (MT) data transfer when the applying UE controlled mobility mode.

If the UE is allowed to move autonomously to another cell when in RRC connected (i.e., the UE context is maintained both at the UE and on the network side), there can be a defined trigger when the UE is allowed to enter the UE controlled mobility mode. One option is to use a specific timer started at the completion of the latest data transfer. This timer would be started both in the UE and in the eNB so that both network elements are kept synchronized with the used operational mode.

When the UE transits to the UE controlled mobility mode, the network cannot be certain of the UE location when MT data arrives. Normally, with full handover (HO) procedures, the mobility is fully in network control, i.e., the location (in cell resolution) is known by the network at all times. Or, if the UE can no longer be reached in that cell in idle mode, the network would normally send a paging message in the whole tracking area. As this is not the case with UE controlled mobility mode, the network is only aware of the last cell where data transfer has taken place. From the network point of view, there should be principles defined for how to initiate a paging procedure (normally sent by the mobility management entity (MME)) when the UE has entered the UE controlled mobility mode, of which only the eNB is aware. If the UE is not reached by the original eNB, the eNB itself cannot send paging to a wider area than its own cell.

One of the issues related to MTC-type communication is the traffic characteristics, which may typically be fairly infrequent small packet data transmission. This result in large signaling overhead compared to the actual payload data that is transferred. In current cellular specifications, the RRC connection is first set up to provide control over the data transmission on user plane (UP). The RRC connection establishment requires multiple signaling procedures, for example random access channel (RACH), exchange of the security credentials, radio configuration for radio resource management (RRM) purposes, and the like, to be completed before the data can be reliably and securely transferred over the radio interface and forwarded towards the core network (CN) UP gateways (GW). It may be beneficial to be able to omit some of the signaling if only a small packet is about to be transmitted. The data packet could be minimum, e.g., a higher layer acknowledgment, for example ACK signal, for a transmitted packet. In such a situation, it seems excessive to have all the signaling included with such acknowledgment.

Therefore, embodiments of the invention provide principles for how the signaling related to UE controlled mobility mode may be enhanced in order to reach optimum behavior with minimized changes to the specifications and with minimized increase in complexity.

As mentioned above, embodiments of the invention include methods and systems for UE context handling with UE autonomous mobility. In one embodiment, the UE may be configured or controlled to enter into UE controlled mobility mode based on a predefined trigger. For instance, the predefined trigger may be a timer, explicit signaling between the UE and network (e.g., eNB), or other predefined trigger mechanisms. The eNB may be in synch with the transition of the UE to the UE controlled mobility mode.

In certain embodiments, the mobility mode may be based on a decision, such as cell re-selections, by the UE. According to an embodiment, the UE may listen to paging from the network and may also listen on a physical downlink control channel (PDCCH), such as when the serving cell has not changed. In an embodiment, needed information, for example UE context, for the RRC connection between the UE and the network may be maintained both in the UE and the eNB.

According to certain embodiments, the eNB may be configured to inform the core network about the UE controlled mobility mode and to upload the UE context to the mobility management entity (MME). In an embodiment, the indication about the mobility mode and/or UE context may be sent with some of the signaling procedures/messages related to context handling, for example UE CONTEXT MODIFICATION RESPONSE, some of the signaling messages related to mobility handling, or by defining a new signaling procedure/message(s) to transfer the indication.

For the MT data core network, a network entity, such as the MME, initiates a paging procedure, which can be optimized for the new mode, the eNB(s) is (are) made aware of the UE's mobility mode, and the UE context is relayed back to eNB(s) to which the paging request is sent. The paging coverage may be optimized for the UE controlled mobility mode to reduce the number of cells where the paging is sent. In one embodiment, when sending the paging message on a RRC layer, there may be an indication to the UE that the eNB has the UE context available and it can be used to resume an existing RRC connection. As a result, there is no need for any specific X2 signaling, for example to acquire UE context from the source cell.

According to an embodiment, the UE may respond to the paging with a connection re-establishment request; alternatively, a connection establishment procedure may be used. Security or re-configuration signaling may not be required once the connection is resumed either in the old (source) or new (target) cell.

In one embodiment, if the UE is not reached in the cell where a previous data transfer occurred, the paging may be sent in a larger area; how the paging is sent may be optimized for the current mobility mode. There can be various options for both how the signaling between the network nodes is performed as well as how the user plane is handled. Messages used between the eNB and MME (and between the MME and SGW) for the operations described above may be either existing messages and/or may be new specified messages.

FIG. 1a illustrates an example of an apparatus 10 according to an embodiment. In an embodiment, apparatus 10 may be a node or element in a communications network or associated with such a network, such as a UE, mobile device, mobile unit, or other device. It should be noted that one of ordinary skill in the art would understand that apparatus 10 may include components or features not shown in FIG. 1a.

As illustrated in FIG. 1a, apparatus 10 includes a processor 22 for processing information and executing instructions or operations. Processor 22 may be any type of general or specific purpose processor. While a single processor 22 is shown in FIG. 1a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a mobile device or unit, such as a UE in LTE or LTE-A, for example. In this embodiment, apparatus 10 may be controlled by memory 14 and processor 22 to transition into a user equipment operational mode based on a predefined trigger. The mobility mode of the apparatus 10 may be based on a decision made by the apparatus 10. The predefined trigger may include, for example, a timer and/or explicit signaling with the network. According to an embodiment, apparatus 10 may also be controlled by memory 14 and processor 22 to synchronize with at least one network node (e.g., eNB) serving the apparatus 10 so that the at least one network node is informed of the transitioning of the apparatus 10 into the user equipment operational mode. The at least one network node (e.g., eNB) may then inform a core network node about the user equipment operational mode, and the core network node may take into account the user equipment operational mode during a following transaction with the apparatus 10. In one embodiment, the user equipment operational mode may be a user equipment controlled mobility mode.

As mentioned above, in one embodiment, apparatus 10 may comprise a user equipment associated with a network. In this embodiment, apparatus 10 may be controlled by memory 14 and processor 22 to listen for paging from the network. According to an embodiment, apparatus 10 may be further controlled by memory 14 and processor 22 to respond to the paging with a connection re-establishment request. In certain embodiments, apparatus 10 may also be controlled by memory 14 and processor 22 to maintain the information needed for a RRC connection.

Figure 1B:
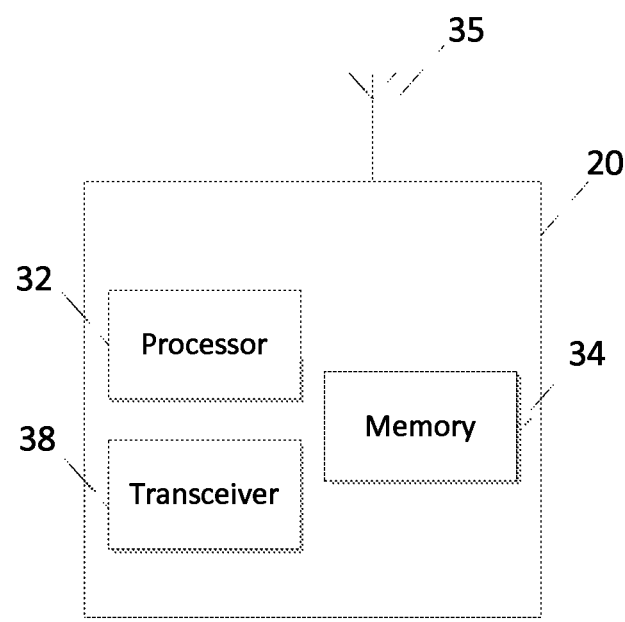
FIG. 1b illustrates a block diagram of an apparatus, according to another embodiment.

FIG. 1b illustrates an example of an apparatus 20 according to another embodiment. In an embodiment, apparatus 20 may be a node, host, or server in a communications network or serving such a network, such as an access point or base station. For instance, in some embodiments, apparatus 20 may be an evolved node B (eNB) in LTE or LTE-A. In other embodiments, apparatus 20 may be a mobility management entity (MME). It should be noted that one of ordinary skill in the art would understand that apparatus 20 may include components or features not shown in FIG. 1b.

As illustrated in FIG. 1b, apparatus 20 includes a processor 32 for processing information and executing instructions or operations. Processor 32 may be any type of general or specific purpose processor. While a single processor 32 is shown in FIG. 1b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network node, such as an eNB in LTE or LTE-A. In this embodiment, apparatus 20 may be controlled by memory 34 and processor 32 to synchronize with a user equipment such that the apparatus 20 is informed of a transitioning of the user equipment into a user equipment operational mode, such as a user equipment controlled mobility mode. For example, in one embodiment, a timer in apparatus 20 may be synchronized with the user equipment and can indicate to apparatus 20 that the user equipment is moving to UE operational mode. According to an embodiment, apparatus 20 may be controlled by memory 34 and processor 32 to provide an indication to a core network about the transitioning of the user equipment into the user equipment operational mode, and to upload user equipment context to a network entity of the core network. According to one embodiment, the network entity of the core network may be a mobility management entity (MME). In one embodiment, apparatus 20 may be further controlled by memory 34 and processor 32 to maintain information needed for a RRC connection.

In another embodiment, apparatus 20 may be a network entity, such as a MME. In this embodiment, apparatus 20 may be controlled by memory 34 and processor 32 to receive an indication of a transitioning of a user equipment into a user equipment operational mode, and to utilize the user equipment operational mode during a following transaction with the user equipment. The indication may be received from at least one network node, such as an eNB, serving the user equipment. At the same time, apparatus 20 may also receive the UE context. Apparatus 20 may also be controlled by memory 34 and processor 32 to initiate a paging request that is optimized for the user equipment operational mode, and to relay user equipment context back to the at least one network node. According to an embodiment, the user equipment operational mode may be a user equipment controlled mobility mode.

In one embodiment, apparatus 20 may be further controlled by memory 34 and processor 32 to send a paging message comprising an indication to the user equipment that the at least one network node has the user equipment context available to resume previous radio resource control connection. In another embodiment, the indication about the availability of UE context can also be added by apparatus 20, and the indication may be sent with RRC signaling (UE-eNB connection). Hence, the indication may not go directly from the MME to UE, for example as NAS information.

Figure 2A:
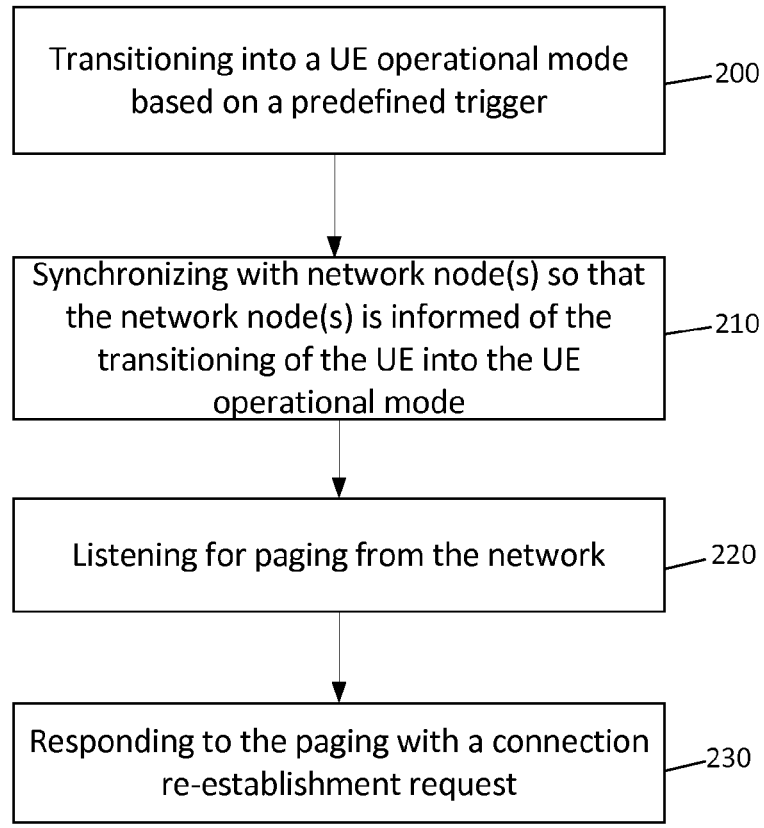
FIG. 2a illustrates a flow diagram of a method, according to an embodiment.

FIG. 2a illustrates a flow diagram of a method, according to one embodiment. In some embodiments, the method of FIG. 2a may be performed by a network node, such as a UE associated with a network. As illustrated in FIG. 2a, the method may include, at 200, transitioning, by the UE, into a UE operational mode (e.g., UE controlled mobility mode) based on a predefined trigger, for example based on expiry of a timer. When in UE controlled mobility mode, the mobility of the UE (e.g., cell re-selections) may be based on a decision by the UE itself. The method may also include, at 210, synchronizing with at least one network node serving the UE so that the at least one network node is informed of the transitioning of the UE into the UE operational mode. The at least one network node may then inform the core network (e.g., MME) of the transitioning of the UE into the UE operational mode so that the core network can take that into account in subsequent transaction(s) with the UE.

In an embodiment, the method of FIG. 2a may further include, at 220, listening for paging from the network and, at 230, responding to the paging, which may have an indication about the UE mobility mode and/or indication about the availability of UE context, with a connection re-establishment request. In some embodiments, the method may also include maintaining, by the UE, information needed for a RRC connection.

Figure 2B:
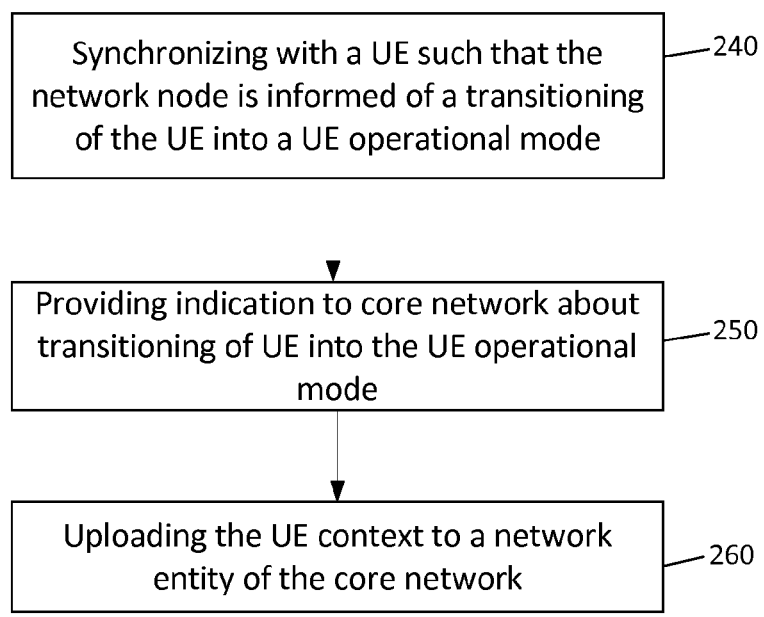
FIG. 2b illustrates a flow diagram of a method, according to an embodiment.

FIG. 2b illustrates a flow diagram of a method, according to one embodiment. In some embodiments, the method of FIG. 2b may be performed by a network node, such as an eNB. As illustrated in FIG. 2b, the method may include, at 240, synchronizing with a UE such that the network node is informed or knows of a transitioning of the UE into a UE operational mode (e.g., UE controlled mobility mode). For example, in one embodiment, a timer in the eNB may be synchronized with the user equipment (or a timer in the user equipment) in order to indicate to the eNB that the user equipment is transitioning to UE operational mode. The method may also include, at 250, providing an indication to a core network about the transitioning of the UE into the UE operational mode. In an embodiment, the method may further include, at 260, uploading the UE context to a network entity (e.g., MME) of the core network.

Figure 2C:
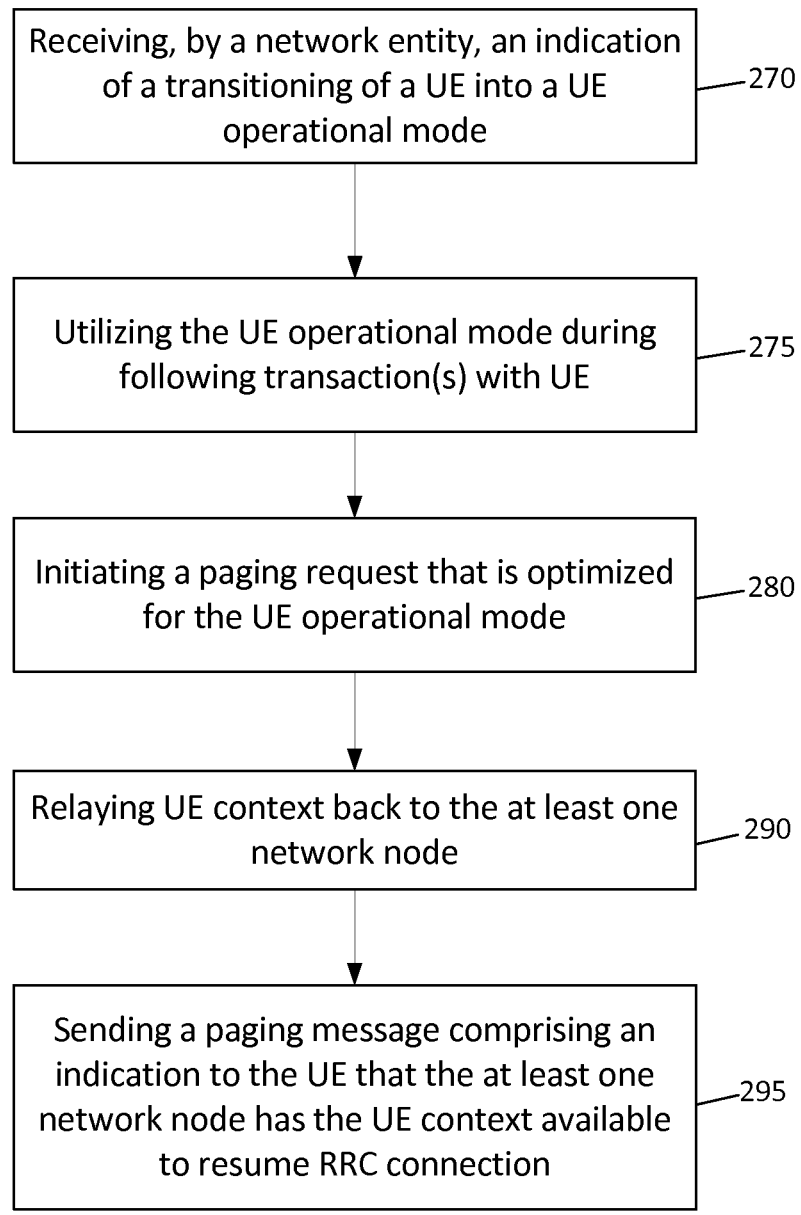
FIG. 2c illustrates a flow diagram of a method, according to an embodiment.

FIG. 2c illustrates a flow diagram of a method, according to one embodiment. In some embodiments, the method of FIG. 2c may be performed by a network entity, such as a MME. As illustrated in FIG. 2c, the method may include, at 270, receiving, by the network entity, an indication of a transitioning of a UE into a UE operational mode (e.g., UE controlled mobility mode), where the indication is received from at least one network node serving the UE. The network node, such as MME, may also receive the UE context for the UE that has transitioned to the UE controlled mobility mode. The method may further include, at 275, utilizing the user equipment operational mode during a following transaction with the user equipment. The method may also include, at 280, initiating a paging request that is optimized for the UE controlled mobility mode and, at 290, relaying UE context and/or indication about the UE mobility mode back to the at least one network node. In an embodiment, the method may further include, at 295, sending a paging message comprising an indication to the UE that the at least one network node has the UE context available to resume previous RRC connection.

In some embodiments, the functionality of any of the methods described herein, such as those illustrated in FIGS. 2a-2c discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, other embodiments of the invention may include a system comprising a radio access network (RAN) that may include network nodes, such as one or more eNBs serving one or more UEs. The system may further include a core network (to which the RAN is connected) that may include one or more core network nodes, such as MMEs. In an embodiment, the RAN informs or makes the core network aware of the UE operational mode. This allows the core network to then take into account the UE operational mode during the following transaction with the UE. The transaction may be data transfer or signaling, for example. According to an embodiment, data transfer may be mobile terminated data transfer.

In one embodiment, the UE operational mode may be a UE controlled mobility mode, and the UE and eNB are synchronized with the UE mobility mode. For example, timers (running both in the UE and RAN node) or explicit signaling can be used to keep UE/RAN synchronized with the UE operational mode.

As mentioned above, in an embodiment, the RAN (e.g., eNB) informs the core network (e.g., MME) about the UE mode. This may be done by the eNB sending an indication about the mobility mode to the core network. In addition, in some embodiments, the eNB may also send the UE context to the core network.

At the following transaction with the UE, the core network may send paging with an indication about the UE mode. In an embodiment, the core network may also relay back the UE context to RAN node(s) (e.g., eNBs).

Based on the indication from the core network, the RAN node (e.g., eNB) may send paging with the indication about the usage of optimized signaling. In the case of UE controlled mobility mode, the indication may trigger a connection re-establishment procedure. In general, however, there may also be other indications each triggering a specific signaling procedure.

According to an embodiment, the RAN node (e.g., eNB) may have the UE context, which may have been received from the core network node with a paging request. In another embodiment, the RAN node may obtain the UE context from a previous serving cell, for example using context fetch (if the cell has changed). As a result, the UE can continue with re-establishment procedure with the assumption that the UE context is at the RAN node. Re-establishment will be successful as the UE context is available and the existing RRC connection can be resumed.

Figure 3A:
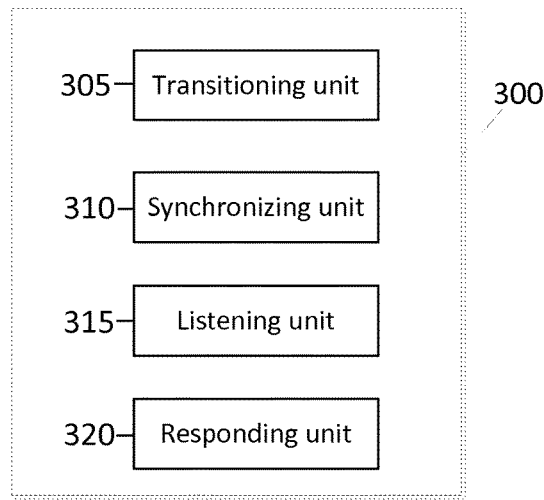
FIG. 3a illustrates a block diagram of an apparatus, according to one embodiment.

FIG. 3a illustrates a block diagram of an apparatus 300, according to another embodiment. In this embodiment, apparatus 300 may include a transitioning unit or means 305 for transitioning into a UE controlled mobility mode based on a predefined trigger. When in UE controlled mobility mode, the mobility of the UE (e.g., cell re-selections) is based on a decision by the UE itself. The apparatus 300 may also include a synchronizing unit or means 310 for synchronizing with at least one network node serving the UE so that the at least one network node is informed of the transitioning of the UE into the UE controlled mobility mode. In an embodiment, the apparatus 300 may further include a listening unit or means 315 for listening for paging from the network. The apparatus 300 may further include a responding unit or means 320 for responding to the paging, which may have an indication about the UE mobility mode and/or indication about the availability of UE context, with a connection re-establishment request. In some embodiments, the apparatus 300 may also include a maintaining unit or means for maintaining information needed for a RRC connection.

Figure 3B:
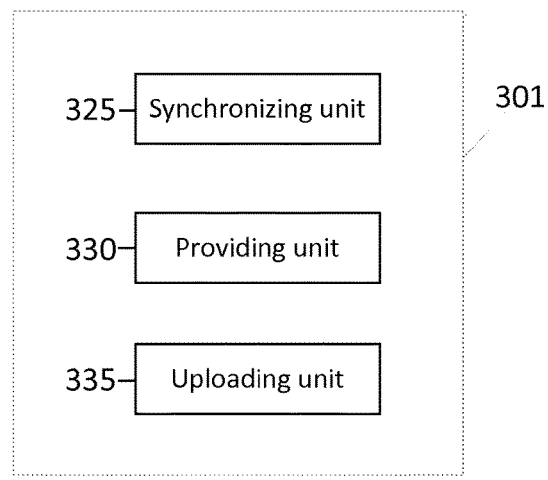
FIG. 3b illustrates a block diagram of an apparatus, according to another embodiment.

FIG. 3b illustrates a block diagram of an apparatus 301, according to another embodiment. In this embodiment, apparatus 301 may include a synchronizing unit or means 325 for synchronizing with a UE such that the apparatus 301 is informed or knows of a transitioning of the UE into a UE controlled mobility mode. For example, in one embodiment, a timer in the eNB may be synchronized with the user equipment (or a timer in the user equipment) in order to indicate to the eNB that the user equipment is transitioning to UE controlled mobility mode. The apparatus 301 may also include a providing unit or means 330 for providing an indication to a core network about the transitioning of the UE into the UE controlled mobility mode. In an embodiment, the apparatus 301 may further include an uploading unit or means 335 for uploading the UE context to a network entity (e.g., MME) of the core network.

Figure 3C:
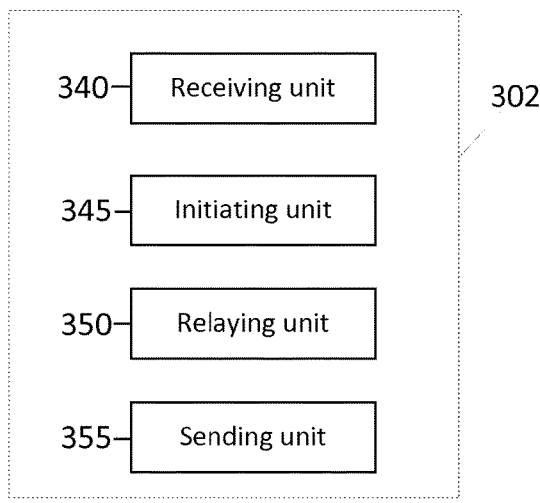
FIG. 3c illustrates a block diagram of an apparatus, according to another embodiment.

FIG. 3c illustrates a block diagram of an apparatus 302, according to another embodiment. In this embodiment, apparatus 302 may include a receiving unit or means 340 for receiving an indication of a transitioning of a UE into a UE controlled mobility mode, where the indication is received from at least one network node serving the UE. The apparatus 302, such as MME, may also receive the UE context for the UE that has transitioned to the UE controlled mobility mode. The apparatus 302 may also include an initiating unit or means 340 for initiating a paging request that is optimized for the UE controlled mobility mode. The apparatus 302 may further include a relaying unit or means 350 for relaying the UE context back to the at least one network node. In an embodiment, the apparatus 302 may further include a sending unit or means 355 for sending a paging message comprising an indication to the UE that the at least one network node has the UE context available to resume an existing RRC connection.

According to certain embodiments, the move of the UE to the UE controlled mobility mode may occur without any interaction with the network (e.g., without interaction with eNB or MME). However, in an embodiment, the move to UE controlled mobility mode may be triggered by expiry of a timer, for instance. A similar synchronized timer may also be configured on the network side so that the network knows when the UE transitions to the UE controlled mobility mode.

In view of the above, embodiments of the invention may provide several advantages. For example, some advantages include reduced signaling overhead with UE controlled mobility mode, minimized mobility and state transitions signaling, and no need for security and re-configuration signaling after cell changes. Also, no X2 signaling is needed when the connection is resumed even though the cell had changed.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
at least one processor; and
at least one memory including computer program code,
the at least one memory and computer program code configured, with the at least one processor, to cause the apparatus at least to
transition into a user equipment operational mode;
synchronize with a network entity serving the apparatus so that the network entity determines the apparatus transitioning into the user equipment operational mode; and
after the network entity determining the apparatus transitioning into the user equipment operational mode, listen for a paging message,
wherein the paging message indicates a signaling procedure to be used, wherein the signaling procedure comprises a connection re-establishment, and wherein the paging message further indicates to the apparatus that the network entity has user equipment context available to resume an existing radio resource control connection,
wherein the user equipment operational mode comprises at least one of a user equipment controlled mobility mode, user equipment type or traffic type.

2. The apparatus according to claim 1, wherein the determination is based on a predefined trigger, and wherein the predefined trigger comprises at least one of a timer or explicit signaling with the network.

3. The apparatus according to claim 1, wherein the transitioning is based on expiry of a timer in the user equipment and in the network entity.

4. The apparatus according to claim 1, wherein the connection re-establishment comprises resuming an existing radio resource control (RRC) connection.

5. The apparatus according to claim 1, wherein the apparatus comprises the user equipment.

6. Apparatus, comprising:
at least one processor; and
at least one memory including computer program code,
the at least one memory and computer program code configured, with the at least one processor, to cause the apparatus at least to
synchronize with a user equipment such that the apparatus determines of a transitioning of the user equipment into a user equipment operational mode;
provide an indication to a core network node about the transitioning of the user equipment into the user equipment operational mode; and
transmit a paging message after providing the indication to the core network node, wherein the paging message indicates a signaling procedure to be used and indicates to the user equipment that the apparatus has user equipment context available to resume an existing radio resource control connection, and wherein the signaling procedure comprises a connection re-establishment, wherein the user equipment operational mode comprises at least one of a user equipment controlled mobility mode, user equipment type or traffic type.

7. The apparatus according to claim 6, wherein the at least one memory and computer program code configured, with the at least one processor, to cause the apparatus at least to send to the core network node the user equipment context along with information about the user equipment operational mode.

8. The apparatus according to claim 6, wherein the indication is sent with signaling messages related to user equipment context handling or mobility handling.

9. The apparatus according to claim 8, wherein the signaling messages related to user equipment context handling is UE CONTEXT MODIFICATION RESPONSE.

10. The apparatus according to claim 6, wherein the apparatus comprises an evolved node B (eNB), and wherein the core network node comprises a mobility management entity.

11. An apparatus, comprising:
at least one processor; and
at least one memory including computer program code,
the at least one memory and computer program code configured, with the at least one processor, to cause the apparatus at least to
receive an indication of a transitioning of a user equipment into a user equipment operational mode, wherein the indication is received from at least one network entity;
perform at least one of sending the user equipment operational mode to at least one network entity or utilizing the user equipment operational mode during a later transaction with the user equipment;
initiate a paging request that is optimized for the user equipment operational mode;
relay user equipment context back to the at least one network entity;
inform one or more network entities, to which the paging request is sent, about the user equipment operational mode; and
send a paging message comprising an indication to the user equipment that the at least one network entity has the user equipment context available to resume an existing radio resource control connection, or an indication about a signaling procedure to be used, wherein the signaling procedure is a connection re-establishment, connection establishment or one of the predefined signaling procedures,
wherein the user equipment operational mode comprises at least one of a user equipment controlled mobility mode, user equipment type or traffic type.

12. The apparatus according to claim 11, wherein the at least one memory and the computer program code are configure, with the at least one processor, to cause the apparatus at least to optimize paging coverage for the user equipment operational mode to reduce the number of cells where the paging request is sent.

13. The apparatus according to claim 11, wherein the apparatus comprises a mobility management entity (MME), and wherein the at least one network entity comprises an evolved node B (eNB).

* * * * *